March 10, 1970 C. B. DE CARBON 3,499,505
ELASTIC SHOCK-ABSORBING SUSPENSION
Filed March 14, 1968 3 Sheets-Sheet 2
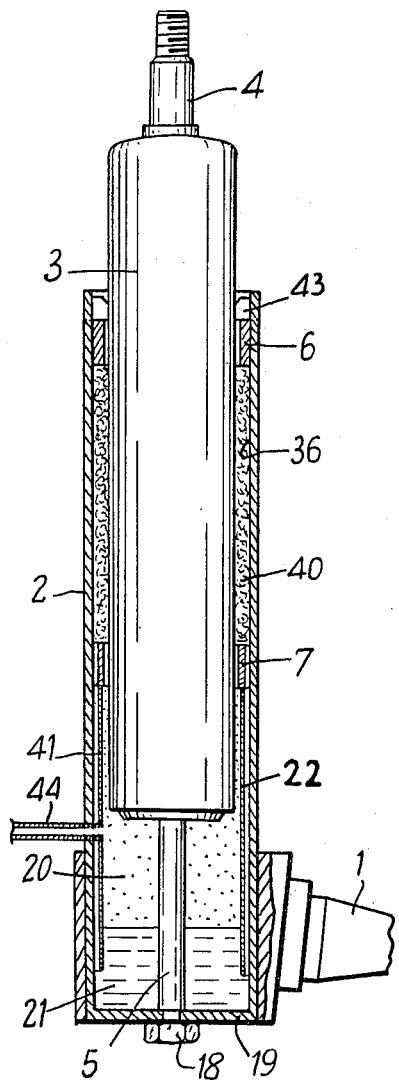
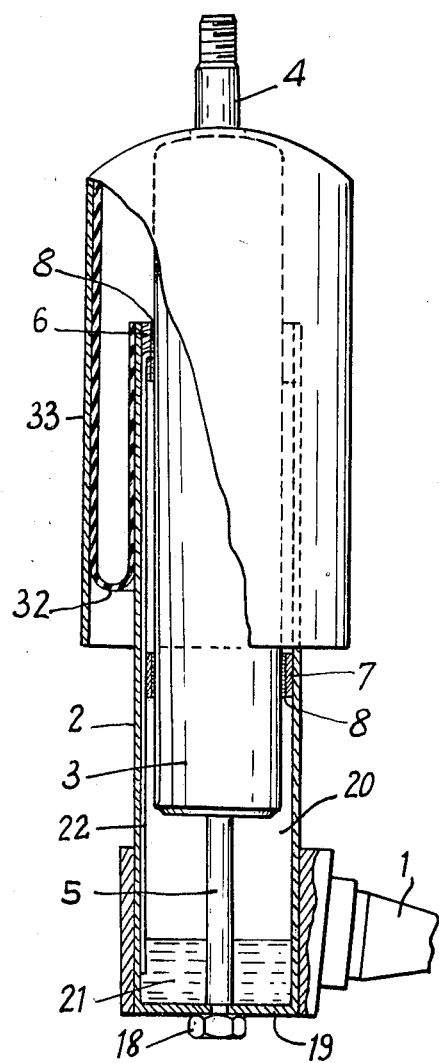
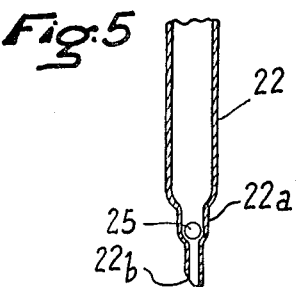
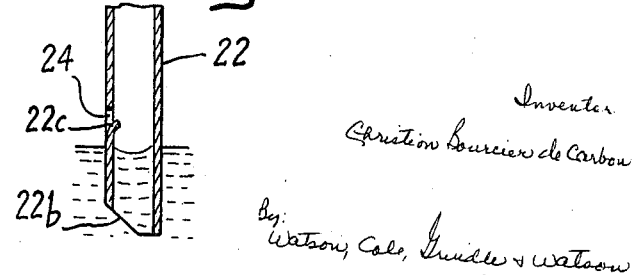

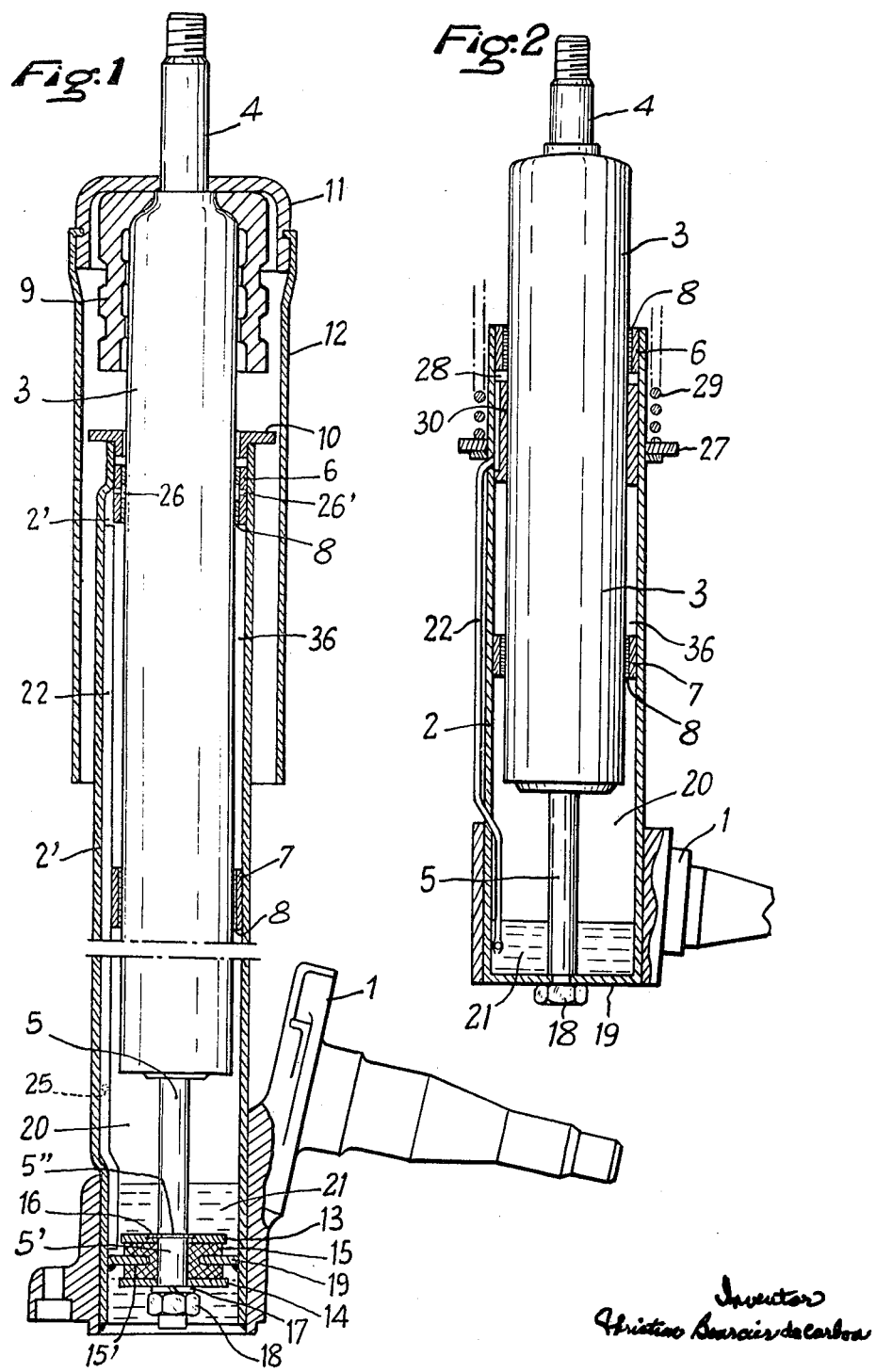

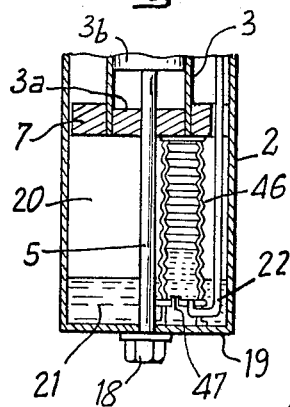
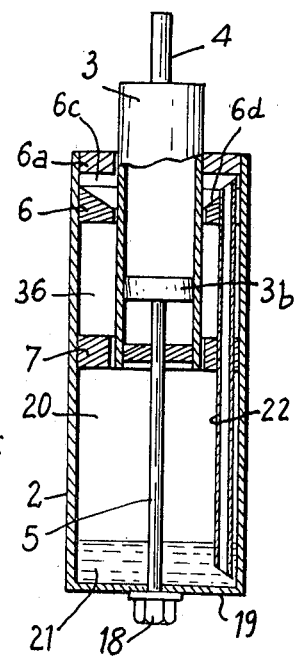
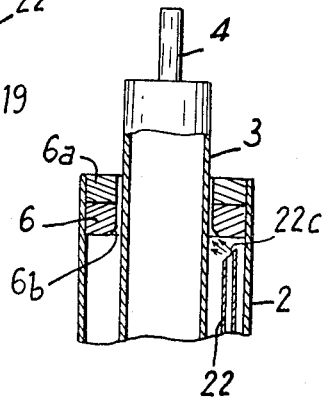
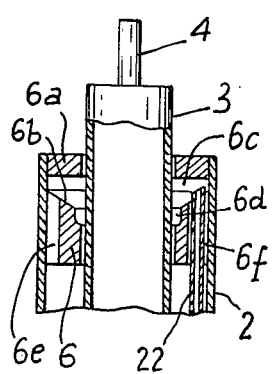
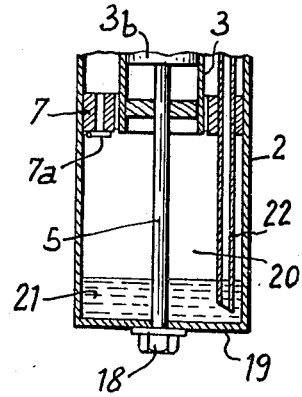
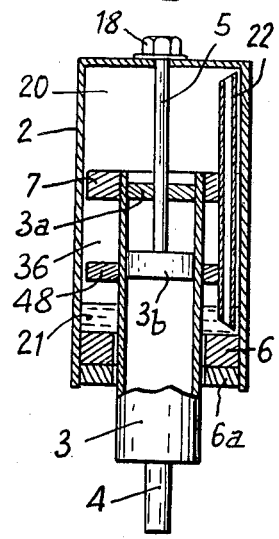

United States Patent Office 3,499,505
Patented Mar. 10, 1970

3,499,505
ELASTIC SHOCK-ABSORBING SUSPENSION
Christian Bourcier de Carbon, 64 bld Maurice-Barres,
92 Neuilly-sur-Seine, France
Filed Mar. 14, 1968, Ser. No. 713,080
Int. Cl. F01m *1/00;* F16n *13/00;* F16d *57/00*
U.S. Cl. 184—6
14 Claims

ABSTRACT OF THE DISCLOSURE

An elastic damping suspension of the type including a guiding tube surrounding a shock absorber, wherein the lubrication is performed by means of a provision of oil carried in a section of the outer guiding tube, preferably its lower end, the oil being conveyed towards the frictional surfaces between the shock absorber and the outer guiding tube by the pumping action exerted between the latter and urging oil into a lubricating pipe extending along a generating line of the guiding tube or as a concentric lining for the latter.

My invention has for its object an elastic shock-absorbing suspension for the stays through which the vehicle wheels are connected with the chassis. Such suspension systems are already known and form means guiding the wheels in a vertical direction, as provided by a shock absorber the outer tube of which carries at its lower end the wheel spindle, which end is connected with the chassis of the vehicle through the agency of pivoting arms, while the upper end of the piston rod of the shock absorber is secured directly to said chassis. Consequently, said piston rod of the shock absorber is subjected to all the flexional stresses produced by the load resting on the wheels, to the reaction arising upon braking and to the lateral stresses produced in turns. The wear of the parts subjected to friction, to wit the outlet end of said piston rod and of the piston itself is consequently considerable and in addition to this drawback, I should also mention the difficulty of maintaining fluid tightness round the piston rod of the shock absorber as it passes out of the tube, which last-mentioned problem is a sequel of such a wear.

It has also been proposed to remove such drawbacks by using a vertical slideway guiding the tube of the telescopic shock absorber as provided by a coaxial outer guiding tube to the bottom of which the piston rod of said shock absorber is secured. This ensures a guiding along a larger bearing surface which is more capable of resisting lateral stresses. However, the known embodiments of such an idea were too intricate or did not provide a much better resistance against wear than other proposed arrangements, since the lubrication of the friction-exerting surfaces formed a problem which it was difficult to solve.

My invention has for its object to eleminate said drawback and more particularly it covers at least a number of the following objects:

A provision of oil is carried in the lower section of the outer guiding tube enclosing the shock absorber and part of said oil is constantly conveyed upwardly by a pumping produced by the relative movement between the tube of the shock absorber and the guiding tube at the points where said tubes frictionally engage each other.

A lubricating tube is provided of which one end is immersed inside the provision of oil, while its other end leads to the upper section of the guiding tube so as to further the conveying of the pumped oil.

The lubricating tube is provided at its lower end with a non-return valve preventing the oil from returning towards the container carrying the provision of oil.

The lower end of the lubricating tube is provided with one or more transverse ports of a reduced diameter, which are designed so as to further the production of an emulsion of oil and air inside the said tube, whereby the conveying of oil in an upward direction is also furthered.

The lubricating tube is inserted in a groove provided in the inner surface of the guiding tube.

The lubricating tube opens into a guiding sleeve inserted at the upper end of the guiding tube and provided with an annular lubricating groove.

The lubricating tube extends outside the guiding tube out of which it passes at a point registering with the oil level, the lubricating tube re-entering the guiding tube at its upper end.

The lubrication tube ends with an upper sleeve bound within the guiding tube and forming an annular space between said sleeve and the guiding sleeve in the guiding tube, while furthermore said sleeve is shaped so as to form between it and the upper shock absorber tube a clearance which is larger than that of the clearance surrounding the guiding sleeve.

The lubricating tube extends coaxially with the guiding tube and the annular gap between the two tubes serves for the conveyance of the lubricating oil.

To guiding sleeves are provided in the guiding tube.

The annular space between said sleeves is at least partly filled by a lining with a capillary action such as a layer of felt adapted to suck in oil out of the provision of oil.

A packing is provided between the upper end of the guiding tube and the upper end of the shock absorber tube projecting beyond the latter, rendering air-tight the free space between the lower end of the guiding tube and the shock absorber tube, this free space being filled with gas under pressure in order to obtain a pneumatic suspension element supporting partly or completely the weight of the vehicle.

A pneumatic suspension chamber is defined by an elastic diaphragm closing it and secured on the one hand to the upper end of the guiding tube and on the other hand to a metal bell-shaped member of a larger diameter extending round the upper ends of the shock absorber tube and of the guiding tube.

The pneumatic suspension element is connected to a seat-correcting means this permitting control of the gas pressure as a function of the loading of the vehicle.

By way of example and with a view to furthering the understanding of the invention, I have illustrated the latter in the accompanying drawings wherein:

FIG. 1 is a vertical cross-section of a first embodiment of my improved suspension.

FIG. 2 is a vertical cross-section of a suspension according to a further embodiment.

FIG. 3 is a vertical cross-section of a suspension according to a third embodiment.

FIG. 4 is a vertical cross-section of a suspension according to a fourth embodiment.

FIG. 5 is a detail view of the lower end of the lubricating tube and of the non-return valve provided thereon.

FIG. 6 is a detail view of the lower end of the lubricating tube provided with ports for the entrance of emulsifying air.

FIG. 7 is a detail view of an arrangement feeding positively the lubrication tube.

FIG. 8 is a detail view of the upper end of the suspension.

FIG. 9 is a vertical cross-section of a further suspension according to another embodiment.

FIG. 10 is a detail view of the upper end of the suspension according to still another embodiment.

FIG. 11 is a detail view of the lower end of said last-mentioned suspension.

FIG. 12 is a diagrammatic sectional view of a suspension system the connections of which are reversed with reference to those of the preceding embodiment.

Turning to the drawing, it is apparent that the suspension system according to my invention includes chiefly a guiding tube 2 carrying at its lower end the wheel spindle support 1 and a telescopic shock absorber the cylinder 3 of which slides inside the guiding tube and is secured through its upper end 4 to the vehicle chassis, whereas the rod 5 of the piston of said shock absorber is secured to the bottom 19 of the guiding tube 2. The guiding sleeves 6 and 7 arranged with the maximum possible spacing between them inside the guiding tube 2 include an anti-friction layer 8 of wear-resisting plastic material. A rubber stop 9 caps the upper end of the shock absorber tube so as to limit its downward travel through abutment of said stop against the plate 10 rigid with the upper end of the guiding tube 2.

A cover 11 providing for the securing of the shock absorber carries an outer protecting sleeve 12. The piston rod 5 carries at its lower end a block of rubber 15 held between washers 13, 14 by the fan-shaped or spring washer 17 and the nut 18 on one side and the circlips 16 on the other side. The bottom plate 19 of the guiding tube 2 is provided with a central aperture the inner periphery of which is fitted inside a corresponding annular groove in the rubber block 15. Upon unscrewing of the nut 18, it is an easy matter to shift the shock absorber upwardly out of the guiding tube.

The chamber 20 formed by the lower end of the guiding tube 2 carries a provision of oil 21. Said oil is pumped upwardly through the lubricating tube 22 towards the upper guiding sleeve 6, the inner anti-friction ling 8 of which is provided with a peripheral annular groove 26 through the lubricant is distributed uniformly.

A fraction of the oil drops into the annular space 36 between the two sleeves after it has lubricated the upper sleeve 6, while the remaining fraction of the oil drops directly, since the tube 22 stops just short of the sleeve 6, onto the lower guiding sleeve 7, so as to lubricate it. The lubricating tube 22 is housed inside a longitudinal groove 2' formed in the inner surface of the guiding tube 2 by stamping or cutting. Said lubricating tube 22 is provided at its lower end with a non-return valve constituted by a ball 25 housed inside a cylindrical section 22a of the lubricating tube 22 and held in position by a section of a smaller diameter the end of which 22b is bevelled off (FIG. 5). The tube 22 may have an oval cross-section in certain cases, so as to take up less room and so as to be held against rotation. In order to further the rising of the oil, it is also possible to provide one or more ports 24 in said tube 22, which ports are obtained each by cutting a tongue 22c in the tube and urging it inwardly. I obtain thus a jet of air directed upwards so as to produce an emulsion of air and oil, which emulsion is more readily conveyed inside the tube 22 of a reduced diameter FIG. 6.

In the embodiment illustrated in FIG. 2, the lubricating tube 22 is located outside the guiding tube 2, so as to eliminate the necessity of forming a groove such as 2' in the latter. The lubricating tube 22 returns into the guiding tube 2 underneath the support 27 carrying the coil spring 29. In this case, a lubricating sleeve 30 is hooped inside the tube 2 in a maner such that an upper annular space 28 is left free between the upper guiding sleeve 6 and the lubricating sleeve 30. Oil is fed into said annular space 28 through the longitudinal groove 30a formed in said lubricating sleeve 30 in registry with the point at which the tube 22 enters the guiding tube.

According to the embodiment illustrated in FIG. 3 the annular clearance between the guiding sleeves 6 and 7 is filled by a layer of felt 40 which is impregnated with oil. The lubricating tube 22' is in this case concentric with the guiding tube 2 and terminates in registry with the lower guiding sleeve 7. The oil is thus conveyed towards the upper guiding sleeve 6 by the capillary action of the felt.

The suspension system according to my invention may advantageously be provided with a pneumatic suspension element constituted for instance by a packing 43 provided between the upper end of the guiding tube 2 and the upper end of the shock absorber tube 3 and to fill the free space 20 between the lower end of the guiding tube 2 and the shock absorber tube 3 with gas under pressure in order to obtain the pneumatic suspension element supporting partly or completely the weight of the vehicle. A pipe 44 is connected to a seat-correcting means thus allowing to vary the amount of gas under pressure as a function of the loading of the vehicle.

According to another embodiment illustrated in FIG. 4 a fluid-tight annular diaphragm 32 is secured on the one hand to the upper end of the guiding tube 2 and on the other hand to the protecting sleeve 33 secured to the upper end of the tube 3 of the shock absorber. This allows a volume of compressed gas 34 to communicate advantageously with seat-correcting means through pipe 33a.

If it is desired to obtain a more positive lubrication it is possible to provide bellows 46 secured to the lower end 3a of the shock absorber on the one hand and to the bottom 19 of the guiding tube on the other hand. The lower end of said bellows carries a suction valve 47 and is connected with the lubricating tube 22. The relative movements between the tubes 2 and 3 causes the oil 21 to be sucked into the bellows 46 and to be sent thereafter into the tube 22 (FIG. 7). In such a case, the lower guiding sleeve 7 is rigidly secured to the tube 3 of the shock absorber.

In FIG. 8, the oil is shown as projected by the bevelled upper edge 22c of the tube 22 towards the cooperating bevelled edge 6b of the sleeve 6, so as to further the introduction of oil between the frictionally interengaging surface. A fluid-tight packing 6a is provided in this case and also in the case of FIG. 9 where an annular gap 6c is formed between said packing 6a and the guiding sleeve 6 which is provided with a frusto-conical recess 6d inside which the oil projected by the tube 22 is collected.

According to a development of said embodiment, it is furthermore possible to provide an annular groove 6d together with longitudinal bores 6e–6f with a view to reducing the pressure in the gap 6c and to provide a passage for the lubricating tube 22 (FIG. 10).

The pumping effect can be still further improved by inserting a non-return valve 7a inside a longitudinal channel formed in the guiding sleeve 7, which allows increasing the pressure of air inside the space 20 surrounding the piston rod 5 while allowing the oil to return freely (FIG. 11).

Obviously, my invention includes the different features described hereinabove, considered singly or in any desired combination.

In particular, it is possible to turn the suspension system upside down without widening the scope of the invention (FIG. 12) in which case the guiding tube 2 is secured to the vehicle chassis, while the tube 3 of the shock absorber carries the wheel spindle. The provision of oil 21 is obviously housed then within the annular space 36 and is conveyed into the chamber 20 through the lubricating tube 22 secured to a guiding disc 48 and extending through the sleeve 7. The fluid-tight packing 6a operates then perfectly without any risk of losing any lubricant.

What I claim is:

1. An elastic shock absorbing suspension system for a vehicle, said system including a shock absorber having two telescoping elements comprising a piston and rod and a cylinder containing damping fluid in which said piston reciprocates, means for connecting the upper end of said shock absorber to the vehicle chassis and the lower end to the wheel spindle, an outer coaxial guiding tube having one of its ends secured to the piston rod of the shock absorber and frictionally and slidingly enclosing the cylinder of said shock absorber, said suspension characterized by the provision of lubricating means for such sliding action, comprising a mass of oil independent of said damping fluid and contained within a portion of said guiding tube, a lubricating pipe connecting said mass of oil with the frictionally engaging surfaces of said tube and cylinder, and means effective through the relative sliding of the shock absorber cylinder relative to the guiding tube for pumping oil through said pipe to said surfaces.

2. Lubricating means for a suspension system as claimed in claim 1, wherein the mass of oil is carried at the bottom of the guiding tube, said lubricating mass comprising a non-return valve at the lower end of the lubricating pipe.

3. Lubricating means for a suspension system as claimed in claim 1, wherein the mass of oil is carried at the bottom of the guiding tube and the lubricating pipe is provided near its lower end with at least one lateral port for the entrance of oil-emulsifying air.

4. Lubricating means as claimed in claim 1, wherein the guiding tube is provided with a groove along a generating line, said groove housing the lubricating pipe.

5. Lubricating means as claimed in claim 1, comprising a lubricating sleeve fitted between the shock absorber and the guiding tube, said sleeve being provided with an inner annular groove and with a radial bore connecting said groove with the end of the guiding pipe remote from the mass of oil.

6. Lubricating means as claimed in claim 1, comprising a lubricating sleeve fitted between the shock absorber and the guiding tube, said sleeve being provided with an inner annular groove and with a radial bore connecting said groove with the end of the lubricating pipe remote from the mass of oil and further sleeves frictionally fitted between the guiding tube and the shock absorber, said sleeves lying respectively above and underneath the said lubricating sleeve.

7. Lubricating means as claimed in claim 1, wherein the lubricating pipe extends outside the guiding tube and includes ends entering the the latter, respectively in registry with the mass of oil and with the cooperating frictional surfaces.

8. Lubricating means as claimed in claim 1, wherein the lubricating pipe extends outside the guiding tube and includes ends entering the latter respectively in registry with the mass of oil and with the cooperating frictional surfaces, said lubricating means comprising furthermore a lubricating sleeve the lower end of which is bound inside the guiding tube and surrounds with a clearance the shock absorber, a narrow clearance being provided between the medial section of said sleeve and the guiding tube into which clearance the corresponding end of the lubricating pipe opens.

9. Lubricating means as claimed in claim 1, wherein the lubricating pipe extends outside the guiding tube and includes ends entering the latter respectively in registry with the mass of oil and with the cooperating frictional surfaces, said lubricating means comprising furthermore a lubricating sleeve the lower end of which is bound inside the guiding tube and surrounds, with a clearance, the shock absorber, a narrow clearance being provided between the medial section of said sleeve and the guiding tube into which clearance the corresponding end of the lubricating pipe opens and further sleeves frictionally fitted between the guiding tube and the shock absorber, said sleeves lying respectively above and underneath said lubricating sleeve.

10. Lubricating means as claimed in claim 1, wherein the lubricating pipe is fitted coaxially inside the outer guiding tube and dips through its lower end into the mass of oil carried at the bottom of the guiding tube.

11. Lubricating means as claimed in claim 1, wherein the lubricating pipe is fitted coaxially inside the outer guiding tube and dips through its lower end into the mass of oil carried at the bottom of the guiding tube, the lubricating means including furthermore two sleeves fitted frictionally between the guiding tube and the shock absorber at different levels above the upper end of the lubricating pipe and a lining of a material having a capillary action fitted between said two sleeves.

12. Lubricating means as claimed in claim 1; comprising an annular pneumatic suspension chamber extending between the shock absorber and the lower end of the guiding tube, a gas-tight packing being provided between the upper end of the guiding tube and the upper end of the shock absorber tube projecting beyond the latter.

13. Lubricating means as claimed in claim 1, comprising an annular pneumatic suspension chamber constituted by an annular elastic diaphragm the inner edge of which is secured along the outer periphery of the end of the guiding tube remote from the mass of oil and a bell-shaped closing member rigid with the shock absorber capping said end of the guiding tube and to the inner surface of which the outer periphery of the diaphragm is secured.

14. Lubricating means as claimed in claim 12, comprising a connection between the annular pneumatic suspension chamber and a seat-correcting means thus allowing to control the gas pressure as a function of the charge of the vehicle.

References Cited

UNITED STATES PATENTS

| 2,475,206 | 7/1949 | Smith. | |
| 2,481,088 | 9/1949 | Cuskie | 188—100 XR |
| 2,875,861 | 3/1959 | Lucien | 188—100 XR |
| 2,945,689 | 7/1960 | Klinger | 188—100 XR |
| 3,372,776 | 3/1968 | Avner et al. | 188—100 |

FRED C. MATTERN, Jr., Primary Examiner

M. A. ANTONAKAS, Assistant Examiner

U.S. Cl. X.R.

188—100; 184—26